United States Patent
Chang

(10) Patent No.: US 6,478,323 B2
(45) Date of Patent: Nov. 12, 2002

(54) TRANSMISSION DEVICE FOR A CHAINLESS BICYCLE

(75) Inventor: Shih-Hsing Chang, Taichung Hsien (TW)

(73) Assignees: Chin-Hsing Tsai, Taichung Hsien (TW); Su-Mei Chang, Taichung Hsien (TW)

( * ) Notice: Subject to any disclaimer, the term of this patent is extended or adjusted under 35 U.S.C. 154(b) by 37 days.

(21) Appl. No.: 09/799,741

(22) Filed: Mar. 5, 2001

(65) Prior Publication Data

US 2002/0121761 A1 Sep. 5, 2002

(51) Int. Cl.⁷ .............................................. B62M 1/02
(52) U.S. Cl. ........................................ 280/260; 280/259
(58) Field of Search ................................ 280/260, 259, 280/262

(56) References Cited

U.S. PATENT DOCUMENTS

| | | | | |
|---|---|---|---|---|
| 3,861,715 A | * | 1/1975 | Mendoza | 280/260 |
| 4,585,244 A | * | 4/1986 | Testa, Sr. et al. | 280/260 |
| 4,721,015 A | * | 1/1988 | Hartmann | 74/750 B |
| 4,955,627 A | * | 9/1990 | Hartmann | 280/236 |
| 5,002,296 A | * | 3/1991 | Chiu | 280/260 |
| 5,078,416 A | * | 1/1992 | Keyes | 280/260 |
| 5,316,327 A | * | 5/1994 | Bell | 280/260 |
| 5,482,306 A | * | 1/1996 | Hsu | 280/260 |
| 5,967,537 A | * | 10/1999 | Chang | 280/259 |
| 6,095,540 A | * | 8/2000 | Kim | 280/259 |

* cited by examiner

Primary Examiner—Paul N. Dickson
Assistant Examiner—L. Lum
(74) Attorney, Agent, or Firm—Kolisch Hartwell, P.C.

(57) ABSTRACT

A chainless transmission device for a bicycle has a front casing, a rear casing, a crank axle and a transmission assembly. The transmission assembly has a transmission shaft, a drive gear, a front gear, a rear gear and a driven gear. A tube is connected between the front casing and the rear casing to receive the transmission shaft. Two ears extend from the front casing. A connector is secured to each ear to connect to the bottom bracket of the bicycle. The transmission device can directly be mounted on a conventional bicycle frame. To install the transmission device on the frame becomes easier. In addition, the transmission shaft can slightly move and rotate relative to the rear gear. This can prevent the transmission from being bent when the bicycle is being ridden. The transmission efficiency and the useful life of the chainless transmission device are improved.

8 Claims, 6 Drawing Sheets

US 6,478,323 B2

TRANSMISSION DEVICE FOR A CHAINLESS BICYCLE

BACKGROUND OF THE INVENTION

1. Field of the Invention

The present invention relates to a transmission device, and more particularly to a chainless transmission device for a bicycle.

2. Description of Related Art

With reference to FIG. 6, a conventional chainless transmission device for a bicycle in accordance with the prior art comprises a front casing (50), a rear casing (52), a crank axle (51) and a transmission shaft (54). The front casing (50) is securely attached to a bottom bracket (62) on the frame (60) of the bicycle. The crank axle (51) is rotatably received in the front casing (50). Each end of the crank axle (51) extends out from the front casing (50) to which a pedal (not shown) is attached. A drive gear (55) is attached to the crank axle (51) to co-rotate with the crank axle (51). A driven gear (58) is attached to the rear wheel axle (66) in the hub (64) of the rear wheel (not shown) and received in the rear casing (52). The hub (64) is held between the rear casing (52) and a chain stay (68) connected to the bottom bracket (62). The rear wheel of the bicycle is mounted on the hub (64). A tube (53) is connected between the front casing (50) and rear casing (52) to receive the transmission shaft (54). A front gear (56) is attached to one end of the transmission shaft (54) to engage with the drive gear (55). A rear gear (57) is attached to the other end of the transmission shaft (54) to engage with the driven gear (58).

Accordingly, when a rider rotates the pedals connected to the crank axle (51), the crank axle (51) will rotate relative to the front casing (50). The hub (64) and the rear wheel will rotate as a result the transmission of the rotational energy through the drive gear (51), the front gear (56), the transmission shaft (54), the rear gear (57) and the driven gear (58). The transmission device can replace the traditional chain transmission device of the bicycle.

However, when the rear wheel hits an object, the wheel with the hub (64) will move upward and vibrate. Because the rear gear (57) is securely attached to the transmission shaft (54) and engages with the driven gear (58), the rear gear (57) will move upward and vibrate with the hub (64). Consequently, the transmission shaft (54) may be bent causing the transmission shaft (54) to rotate along a bent axis. The friction increases when the transmission shaft (54) rotates, and the transmission efficiency of the transmission shaft (54) is reduced.

Since the conventional front casing (50) is received in the bottom bracket (62), a base (502) is formed on the front casing (50) so the tube (53) can be connected to the front casing (50). A notch (622) is defined in the bottom bracket (62) to engage with the base (502), such that the base (502) is exposed from the notch (622) to connect with the tube (53). However, because the bottom bracket (62) must be machined to fit the front casing (50), the process for manufacturing the bicycle frame (60) is complex. Furthermore, if the actual position of the notch (622) is not in the desired position due to an error in the forming process, it is extremely difficult to install the transmission device in the bicycle frame (60).

To overcome the shortcomings, the present invention tends to provide an improved chainless transmission device to mitigate or obviate the aforementioned problems.

SUMMARY OF THE INVENTION

The main objective of the invention is to provide an improved chainless transmission device that is easily installed in the bicycle frame. The transmission device has a front casing, a rear casing, a crank axle and a transmission assembly. The transmission assembly has a transmission shaft, a drive gear, a front gear, a rear gear and a driven gear. A tube is connected between the front casing and the rear casing to receive the transmission shaft. Two ears extend from the front casing. A connector is secured to each ear to connect to the bottom bracket of the bicycle. Consequently, the bottom bracket does not needed to be machined. The transmission device can be mounted directly on a conventional bicycle frame. To install the transmission device on the frame becomes easier.

Another objective of the invention is to provide an improved chainless transmission device wherein the transmission shaft can move slightly and rotate relative to the rear gear to prevent the transmission from being bent. The transmission efficiency and the useful life of the chainless transmission device are improved.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
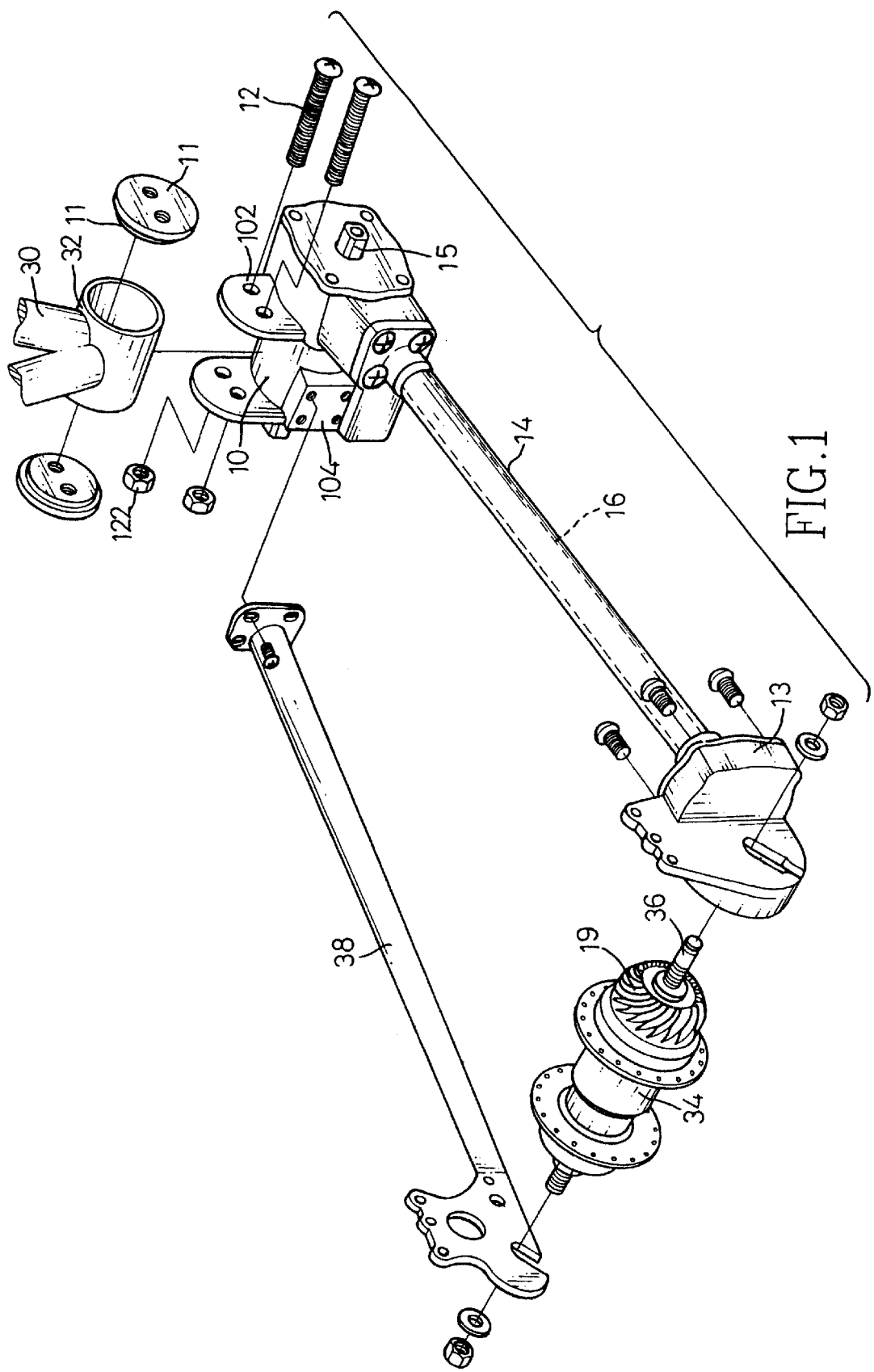
FIG. 1 is an exploded perspective view of a chainless transmission device in accordance with the present invention.
Figure 2:
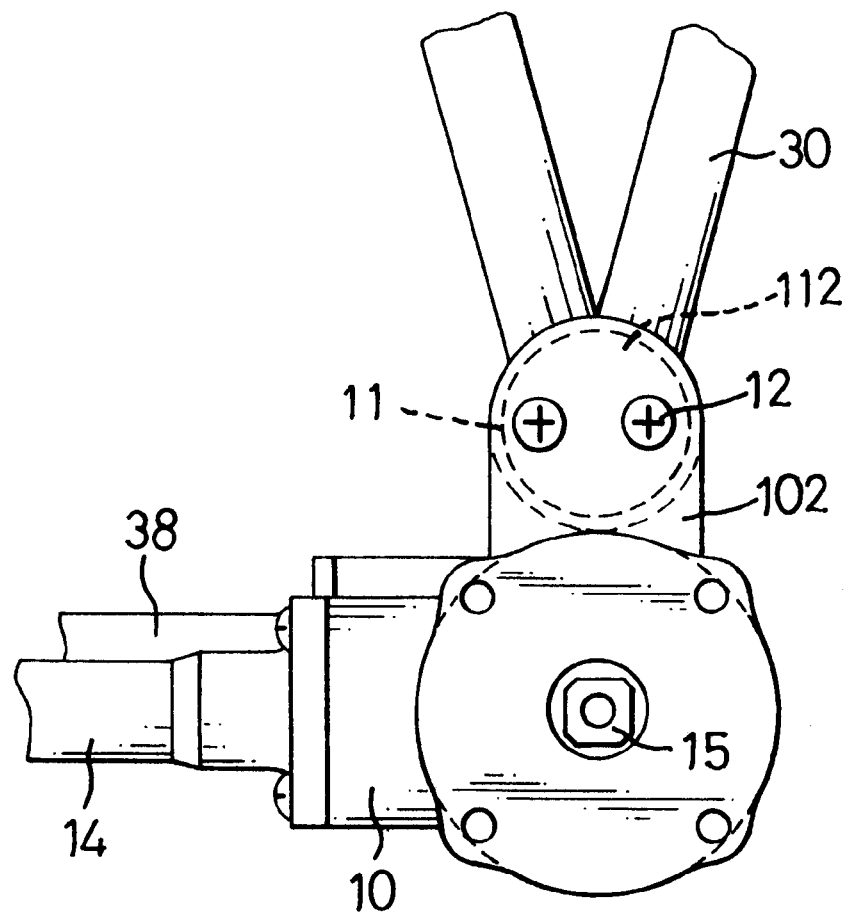
FIG. 2 is a partial side plan view of the transmission device in FIG. 1 showing the attachment of the front casing and the bottom bracket of a bicycle.
Figure 3:
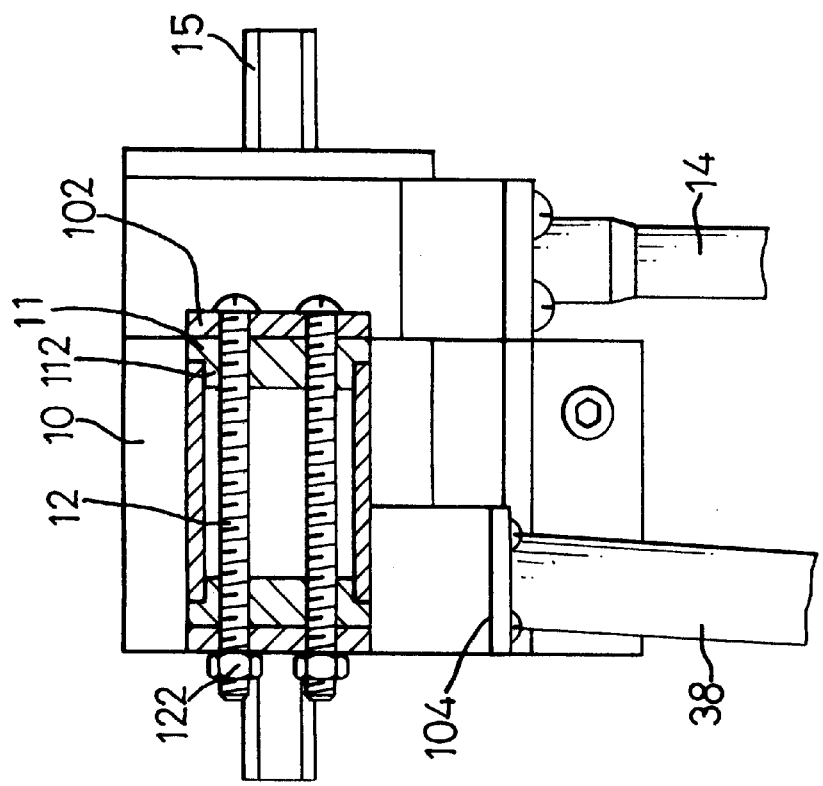
FIG. 3 is a top plan view in partial section of the transmission device in FIG. 2 showing the attachment of the front casing and the bottom bracket.

With reference to FIG. 1, a transmission device for a chainless bicycle in accordance with the present invention comprises a front casing (10), a rear casing (13), a crank axle (15) and a transmission assembly. The front casing (10) is connected to the bottom bracket (32) of a bicycle. With reference to FIGS. 1 to 3, two ears (102) extend from the front casing (10). A connector (11) is attached to each ear (102) and has a circular protrusion (112). The protrusion (112) on each connector (11) is fit into one end of the bottom bracket (32). Multiple bolts (12) extend through the ears (102), the protrusions (112) of the connectors (11) and the bottom bracket (32). A nut (122) is screwed onto each bolt (12), such that the front casing (10) is attached to the bottom bracket (32) by the connectors (11) and the bolts (12). Because the front casing (10) can be directly mounted on a conventional bottom bracket without any further machining, installing the transmission device on the frame becomes easier. In addition, because the protrusion (112) of each connector (11) is circular and can rotate relative to the bottom bracket (32), the front casing (10) can rotate relative to the bottom bracket (32) to adjust the angle and position of the front casing (10) relative to the bottom bracket (32). To install the transmission device on a bicycle frame (30) become easier and more flexible.

With reference to FIG. 1, the rear casing (13) is connected to the front casing (10) by a tube (14). A base (104) is formed on the front casing (10) so a chain stay (38) can be attached to the base (104). The rear wheel axle (36) in the hub (34) of the bicycle is engaged between the chain stay (38) and the rear casing (13). A seat stay (not shown) is mounted on each of the rear casing (13) and the chain stay (38), such that a rear fork assembly of the bicycle can be constituted of the tube (14), rear casing (13), chain stay (38) and the seat stays.

The crank axle (15) is rotatably mounted in the front casing (10). Each end of the crank axle (15) extends out from the front casing (10) to which a pedal (not shown) is connected.

Figure 4:
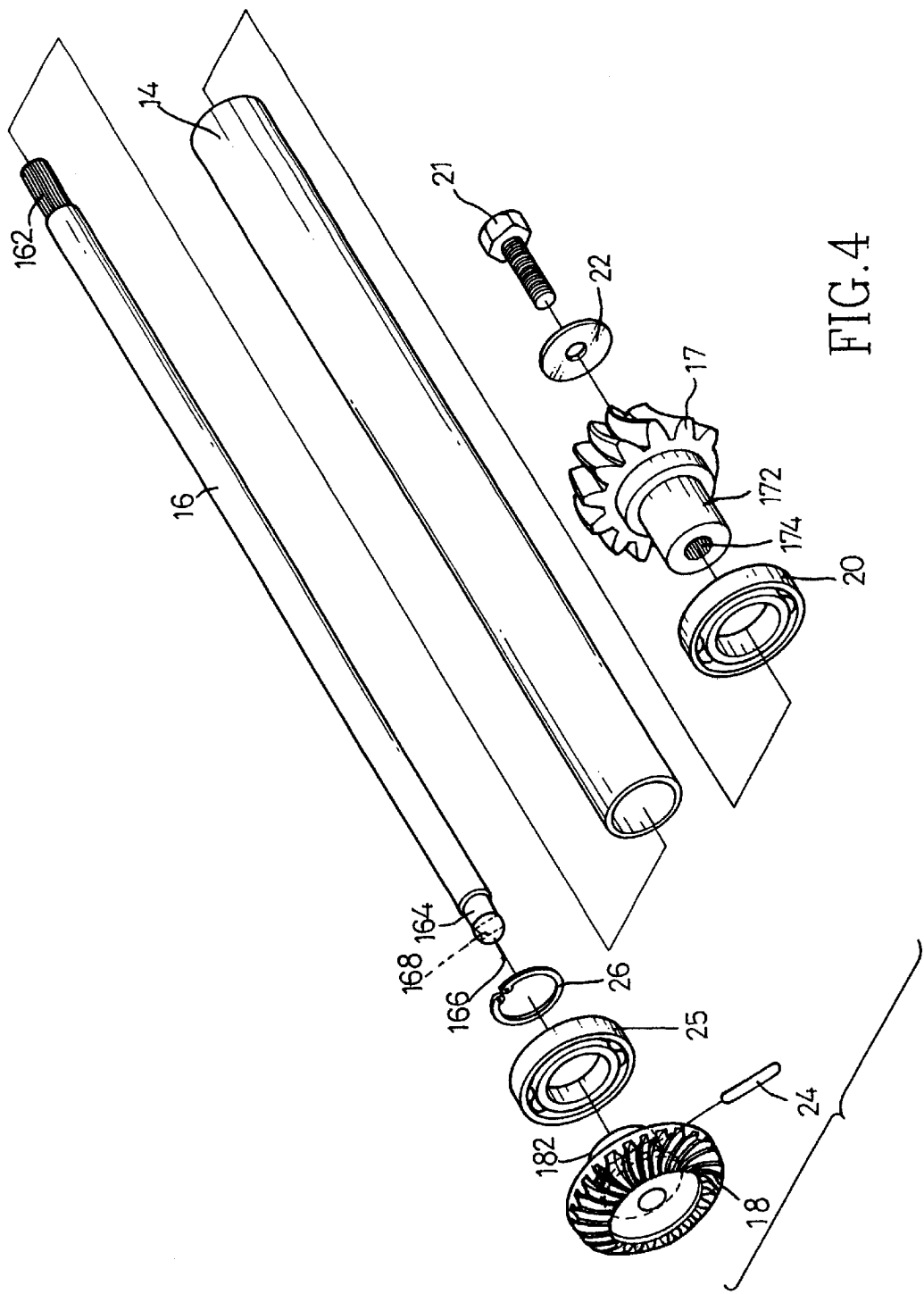
FIG. 4 is an exploded perspective view of the transmission shaft, the front gear and the rear gear of the transmission device in FIG. 1.
Figure 5:
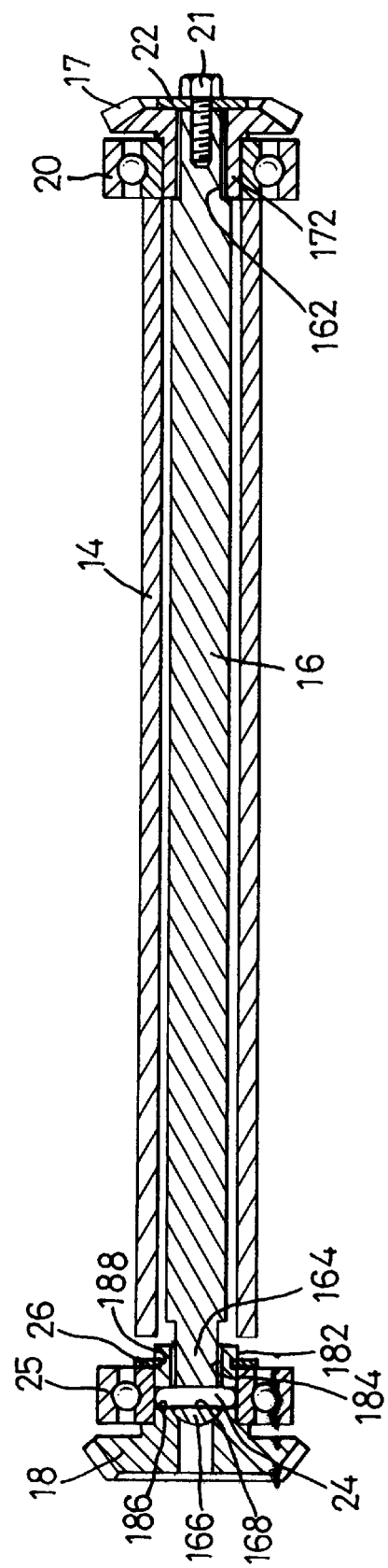
FIG. 5 is a cross sectional side plan view of the transmission assembly in FIG. 4.
Figure 6:
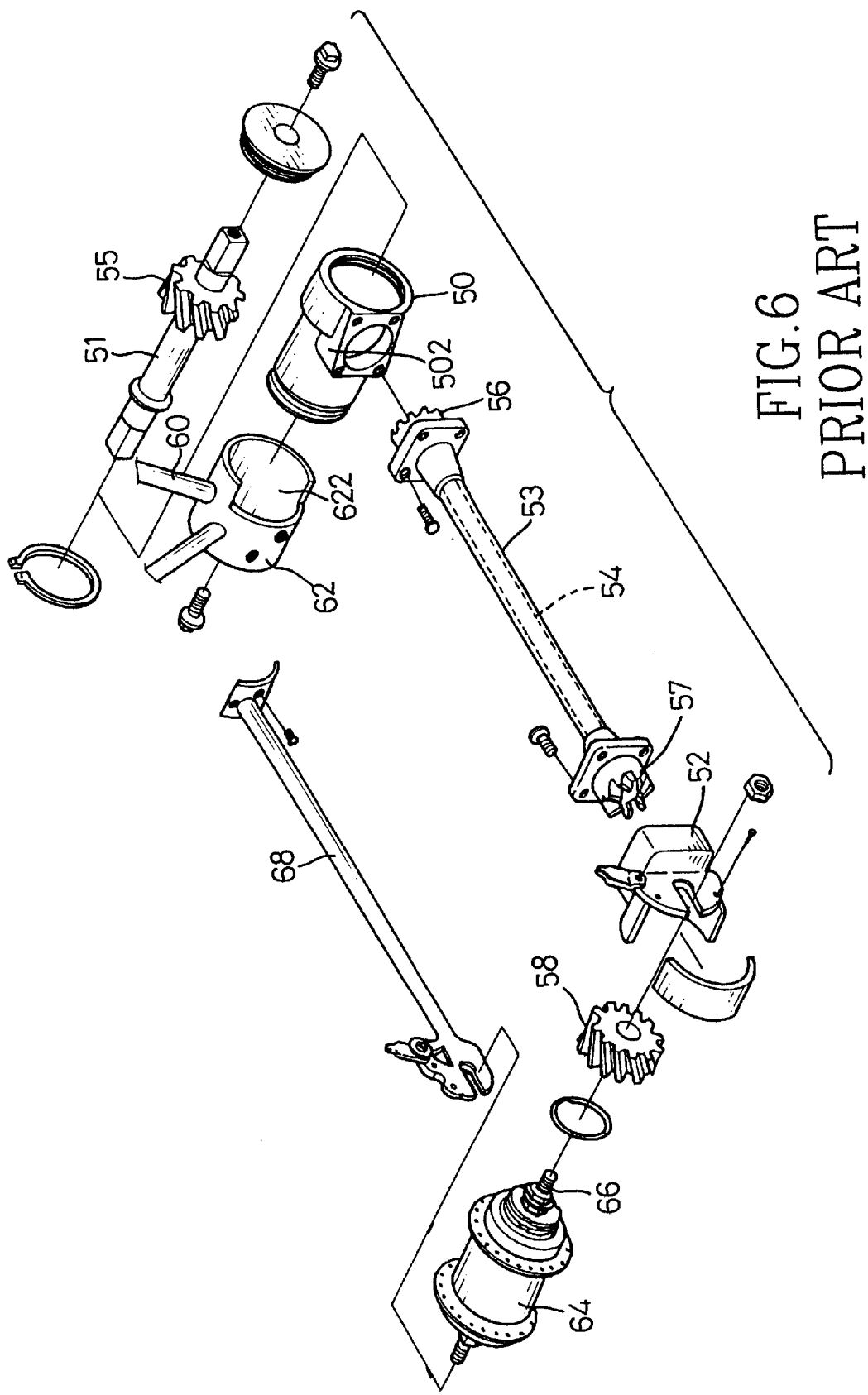
FIG. 6 is an exploded perspective view of a conventional chainless transmission device in accordance with the prior art.

With reference to FIGS. 1, 4 and 5, the transmission assembly comprises a transmission shaft (16), a drive gear (not shown), a driven gear (19), a front gear (17) and a rear gear (18). The transmission shaft (16) is rotatably received in the tube (14). One end of the transmission shaft (16) extends into the front casing (10). The other end of the transmission shaft (16) extends into the rear casing (13). The drive gear (not shown) is attached on and co-rotates with the crank axle (15). The driven gear (19) is attached to the rear wheel axle (36) on the hub (34) of the bicycle. The driven gear (19) is received in the rear housing (13). The front gear (17) is attached to one end of the transmission shaft (16) and received in the front casing (10). The front gear (17) engages with the drive gear. Teeth (162) are formed on the end of the transmission shaft (16) with the front gear (17). A stub (172) extends from one side of the front gear (17). Inner teeth (174) are defined in the stub (172) to engage with the teeth (162) on the transmission shaft (16), such that the transmission shaft (16) rotates with the front gear (17) by means of the engagement between the teeth (162) and the inner teeth (174). In practice, the end of the transmission (16) with the teeth (162) extends through the front gear (17). A threaded hole (not numbered) is defined in the end of the transmission shaft (16) with the teeth (162). A bolt (21) extending through a washer (22) is screwed into the threaded hole in the transmission shaft (16). Consequently, the front gear (17) is secured to the transmission shaft (16). In addition, a bearing (20) is received in the front casing (10) and pressed onto the stub (172) on the front gear (17). The bearing (20) is clamped between the front gear (17) and one end of the tube (14). The rotation of the front gear (17) will be smoother.

The rear gear (18) is attached to the other end of the transmission shaft (16) and is received in the rear casing (13). The rear gear (18) engages with the driven gear (19). A neck (164) with a diameter smaller than that of the transmission shaft (16) is formed on the transmission shaft (16). A ball (166) with a diameter larger than that of the neck (164) is formed on the free end of the neck (164). A through hole (168) is laterally and radially defined through the ball (166). A stub (182) extends from one side of the rear gear (18). A central hole (184) with a diameter larger than that of the neck (164) on the transmission shaft (16) is defined in the stub (182) on the rear gear (18). The neck (164) and the ball (166) are received in the central hole (184) of the stub (182), such that a gap is defined between the inner surface of the central hole (184) and the neck (164). A through hole (186) is defined in the stub (182) and aligns with the through hole (168) in the ball (166). A pin (24) extends through the through holes (186,168) of the stub (182) and ball (166) to pivotally connect the ball (166) to the stub (182). In addition, a bearing (25) is received in the rear casing (13) and pressed onto the stub (182) on the rear gear (18). A annular groove (188) is defined around an outer periphery of the stub (182). A fastener (260) is secured in the groove (188) to abut the bearing (25). Consequently, the rotation of the rear gear (18) becomes smoother.

With reference to FIGS. 1, 4 and 5, when a rider rotates the pedals attached to the crank axle (15), the crank axle (15) will rotate. The rear wheel axle (36) will rotate by means of the transmission of the rotational energy through the transmission assembly including the drive gear, the front gear (17), the transmission shaft (16), the rear gear (18) and the driven gear (19). The bicycle with the chainless transmission device will move forward.

In addition, because there is a gap defined between the neck (164) of the transmission shaft (16) and the stub (182) of the rear gear (18), and the ball (166) is pivotally connected to the stub (182), the rear gear (18) can rotate relative to the transmission shaft (16) in a range. This can prevent the transmission shaft (16) from bending when the rear wheel hits an object. The rotating axis of the transmission shaft (16) can be always kept in a straight line. Consequently, the transmission efficiency of the transmission shaft (16) can be improved, and the useful life of the transmission device is prolonged.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A transmission device for a bicycle having a frame, a bottom bracket mounted on the frame and a hub with a rear wheel axle, the transmission device comprising:

a front casing;

a crank axle rotatably mounted in the front casing and having two ends each extending out from the front casing to be adapted to be connected with a pedal;

a drive gear rotatably attached to the crank axle;

a tube securely connected to the front casing with one end of the tube;

a rear casing securely connected to the other end of the tube;

a transmission shaft rotatably received in the tube and having a first end extending into the front casing and a second end extending into the rear casing;

a front gear rotatably attached to the first end of the transmission shaft and received in the front casing to mate with the drive gear;

a rear gear rotatably attached to the second end of the transmission shaft and received in the rear casing; and a driven gear rotatably received in the rear casing and engaging with the rear gear to be adapted to be attached to the hub;

wherein two ears extend from the front casing;

a connector is secured to each ear and has a circular protrusion adapted to be fit into one end of the bottom bracket; and multiple bolts extend through the ears, the connectors and a nut screws onto each bolt to attach the front casing to the bottom bracket by the connectors.

2. The transmission device as claimed in claim 1, wherein teeth are formed on the first end of the transmission shaft; and a stub extends from one side of the front gear and has inner teeth to engage with the teeth on the transmission shaft.

3. The transmission device as claimed in claim 2, wherein a bearing is received in the front casing and attached on the stub on the front gear, thereby the front gear can rotate freely relative to the front casing.

4. The transmission device as claimed in claim 1, wherein the first end of the transmission shaft extends through the front gear and has a threaded hole defined in the first end; and a bolt extending through a washer is screwed into the threaded hole of the transmission shaft to securely attach the front gear to the first end of the transmission shaft.

5. The transmission device as claimed in claim 1, wherein a neck with a diameter smaller than that of the transmission shaft is formed on the second end of the transmission shaft;

a ball with a diameter larger than that of the neck is formed on a free end of the neck;

a through hole is laterally and radially defined through the hole;

a stub extends from one side of the rear gear to connect with the transmission shaft;

a central hole with a diameter larger than that of the neck on the transmission shaft is defined in the stub on the rear gear to receive the ball and the neck;

a gap is defined between an inner surface of the central hole and the neck;

a through hole is defined in the stub and aligns with the through hole of the ball; and a pin extends through the through holes in the stub and the ball to pivotally connect the ball to the stub, thereby the rear gear is pivotally connected to the second end of the transmission shaft.

6. The transmission device as claimed in claim 5, wherein a bearing is received in the rear casing and attached on the stub on the rear gear, thereby the rear gear can rotate freely relative to the rear casing.

7. The transmission device as claimed in claim 6, wherein a groove is defined around an outer periphery of the stub; and a fastener is secured in the groove to securely hold the bearing.

8. The transmission device as claimed in claim 1, wherein a base is formed on the front casing and is adapted to have a chain stay rested thereon.

* * * * *